United States Patent Office 2,781,266
Patented Feb. 12, 1957

2,781,266
LACTASE-HYDROLYZED LACTOSE IN FEED

Edwin G. Stimpson, Sayville, N. Y., assignor, by mesne assignments, to National Dairy Products Corporation, New York, N. Y., a corporation of Delaware No Drawing. Application November 25, 1952, Serial No. 322,579

14 Claims. (Cl. 99—9)

This invention relates to improved animal and poultry feeds and feed supplements, and more particularly, to feeds containing lactase-hydrolyzed lactose as a carbohydrate source.

Milk products containing lactose have long been used as a nutrient component for animal and poultry feeds. In certain cases, however, and depending upon the species involved, lactose in amounts of 5 to 10% by weight of the feed tends to cause diarrhea and similar intestinal upsets. For this reason it has not been practical to employ large amounts of lactose-containing milk products in animal and poultry feeds.

Also as a consequence of the insolubility of lactose in water, when liquid food products which contain over 18% of lactose are subjected to low temperatures, lactose may crystallize. Even when warmed lactose crystals may persist in the products, due to the difficulty with which lactose dissolves in water. Furthermore, storage at subfreezing temperatures may lead to protein denaturation as the lactose crystallizes.

In patent application Serial No. 198,506, now Pat. No. 2,681,858, filed November 30, 1950, of which this application is a continuation-in-part, there is described a process for the production of milk products wherein the lactose has been hydrolyzed by the action of lactase enzyme to glucose, galactose and other soluble sugars and condensation products thereof. These products are obtained by the lactase hydrolysis of whey, skim milk and like materials.

In accordance with the instant invention, lactase-hydrolyzed lactose, such as is obtained by the lactase hydrolysis of lactose in milk products, is incorporated as a carbohydrate source in animal and poultry feed and feed supplements. Inasmuch as the lactase hydrolysis products contain only negligible amounts of lactose, there is no practical upper limit on the amount of such products which can be incorporated in the feed except as is imposed by maintaining a proper nutrient balance. Problems due to crystallization of lactose are also avoided, for the hydrolyzed materials are appreciably more soluble in water than is lactose. There is a higher weight gain per feed unit weight, i. e., a higher feed efficiency, and/or a greater weight gain in a given period of time than is obtained with a lactose feed, tending to show that the hydrolysis products are more readily assimilated by the animals and poultry than is lactose.

A further effect has been observed which is quite unexpected, namely, that feeds and feed supplements containing lactase-hydrolyzed lactose are more appealing to animals and poultry than lactose-containing feeds. In consequence of this the animals and poultry tend to eat more of the feed, and, as a consequence grow more rapidly and gain more weight than when fed the lactose-containing feed.

The lactase-hydrolyzed lactose can be obtained by the processes known to those skilled in the art. It is, however, preferred to employ milk and milk products wherein the lactose is hydrolyzed by the action of a lactase enzyme system as set forth in patent application Serial No. 198,506, now Pat. No. 2,681,858.

In accordance with this process a lactase enzyme preparation is added to concentrated or pasteurized milk products and the mixture then is held under conditions favoring lactase hydrolysis of lactose to glucose, galactose, and condensation and/or polymerization products thereof. The process is applicable to milk products of all types and the term "milk product" is used generically in the prior application and in this application to refer not only to milk and skim milk but also to the lactose-containing products derived from any of these milks, including whey, cows' milk, mares' milk, goats' milk, ewes' milk and other secretions of the mammary glands of mammals. Such lactose-containing products include, for example, whey, mother liquor wash water derived from casein or cheese manufacture in the production of lactose from whey or milk products, and lactalbumin mother liquors such as those obtained following the precipitation of lactalbumin.

In accordance with the process of the prior application, it is possible to produce milk products the lactose of which has been up to 90% hydrolyzed or more, depending upon the conditions of the hydrolysis. It will be understood that in the feeds and feeds supplements of the instant invention milk products the lactose of which has been hydrolyzed to any desired extent can be employed. Usually, it is preferred to employ a milk product of which the lactose is at least 50% hydrolyzed, but products which have been subjected to only a 30% hydrolysis or less are also useful. Products having varying proportions of hydrolyzed and unhydrolyzed lactose can be prepared as has been described by arresting the hydrolysis at any stage, by varying the amount of lactase enzyme, and other expedients, all of which are set forth in the prior application.

Under some circumstances, it is desirable to employ a milk product which has been concentrated to a high solids content, say 30% solids or higher. Dried hydrolyzed milk products also can be used.

The lactase-hydrolyzed lactose, usually in the form of a lactase-hydrolyzed milk product, can be incorporated with other nutrient materials to form a typical animal or poultry feed with added lactase-hydrolyzed lactose. Such feeds have the food value, i. e., retain the valuable nutrient properties, of feeds containing ordinary unhydrolyzed lactose, with the additional advantages attending the use of lactase-hydrolyzed lactose.

The amount of the lactase-hydrolyzed lactose which can be incorporated will depend upon the end use of the feed and is readily ascertained. The feed can be prepared in liquid form, such as a solution or emulsion, or as a powder. Powdered feeds, for example, readily can be prepared by incorporating the desired nutrient materials in the liquid lactase-hydrolyzed milk products and then drying the preparation under suitable conditions which preserve the nutrient value of the components, such as by tray or spray drying. For example, a carrier such as soy bean flour, corn flour, or oat groat flour can be added to the lactase-hydrolyzed milk product and the resulting slurry spray dried.

The feed can constitute the basal ration. It is preferable, however, to add the lactase-hydrolyzed lactose to the diet as supplementary material which will improve the generally accepted basal ration.

Other nutrient materials which can be added to impart balance to the feed include other milk products such as dried butter milk, concentrated butter milk, dried skim milk and dried whole milk, cereal products such as soy meal, soy flour, corn flour, ground corn, whole oats, ground oats, wheat germ meal and barley and fats such as lard, soy bean oil, and like animal or vegetable fats. In addition to these materials the composition may contain vitamin supplements, such as vitamin B and niacin and trace minerals sufficient to satisfy any feed nutrient requirement.

Usually, the lactase-hydrolyzed lactose will be added in amounts to furnish from 1 to 50% lactase-hydrolyzed lactose in the diet, depending upon the animal or poultry species, and the age of the animal. Thus, in the case of pigs, it is convenient to feed large percentages of lactose-hydrolyzed lactose, ranging from 3 to 20% (4 to 30% as hydrolyzed whey), in the overall diet from the time the pigs are able to eat supplementary food up until approximately the fourteenth week. The hydrolyzed lactose is then reduced to from 0.5 to 2% by weight of the diet and the amounts of other nutrient materials are increased accordingly.

The incorporation of from 1 to 15% lactase-hydrolyzed lactose (2 to 20% as hydrolyzed whey) in the basal ration of poultry gives improved growth.

For calves there can be incorporated in the ration from 2 to 50% lactase-hydrolyzed lactose, as for instance lactase-hydrolyzed skim milk; similar benefits are obtained. A transition feed to supplement pasture for beef cattle would have a similar content of lactase-hydrolyzed lactose.

In the case of each of the above animals and poultry the incorporation of lactase-hydrolyzed lactose produces lower mortality, lower feed cost per 100 lb. of growth and greater gains in weight. This in comparison with equivalent feeds containing unhydrolyzed lactose shows that the improvements are due to the lactase-hydrolyzed lactose in the diet.

The following examples illustrate the invention.

EXAMPLE 1

Four groups of eight young rats were fed the following four diets ad libitum for an eight week test period.

One group was fed diet A and another diet B:

| Ingredient | Diet A 71.1% whey powder (g.) | Diet B 71.1% lactase-hydrolyzed whey concentrate (g.) |
|---|---|---|
| Whey powder | 71.1 | |
| Lactase-hydrolyzed whey powder | | 71.1 |
| Casein | 10.8 | 10.8 |
| Salt mixture (U. S. P.) | 1.3 | 1.3 |
| Butterfat | 3.0 | 3.0 |
| Cod liver oil+E and K [1] | 2.0 | 2.0 |
| Cornstarch+vitamins [2] | 2.5 | 2.5 |
| Liver (1–20) | 1.0 | 1.0 |
| Cornstarch | 8.3 | 8.3 |
| Total | 100.0 | 100.0 |

[1] Each g. cod liver oil contained 5 mg. alpha tocopherol and 1 mg. vitamin K.
[2] 2.5 g. supplied 3 mg. calcium pantothenate, 30 mg. niacin, 0.6 mg. riboflavin, 0.6 mg. pyridoxine, 0.6 mg. thiamine, 75 mg. choline chloride, 75 mg. inositol and 75 mg. para-amino-benzoic acid.

One of the remaining two groups of rats was fed on condensed skim milk and the other on lactase-hydrolyzed condensed skim milk, supplemented in each case with 0.2 cc. cod liver oil, 1 cc. of an aqueous mineral solution containing 0.33 g. iron citrate, 0.026 g. manganese sulfate and 0.03 g. copper sulfate in 50 cc. of solution three times weekly.

At the end of three weeks the following lactase-hydrolyzed whey concentrate diet was substituted for the 71.1% lactase-hydrolyzed whey powder diet:

| Ingredient | 104.9% Lactase-hydrolyzed whey concentrate (g.) |
|---|---|
| Lactase-hydrolyzed whey concentrate | 104.9 |
| Casein | 10.8 |
| Salt mixture (U. S. P.) | 1.3 |
| Butterfat | 3.0 |
| Cod liver oil+E and K [1] | 2.0 |
| Cornstarch+vitamins [2] | 2.5 |
| Liver (1–20) | 1.0 |
| Cornstarch | 8.3 |
| Total | 133.8 |

[1] Each gm. cod liver oil contained 5 mg. alpha tocopherol and 1 mg. vitamin K.
[2] 2.5 gm. supplied 3 mg. calcium pantothenate, 30 mg. niacin, 0.6 mg. riboflavin, 0.6 mg. pyridoxine, 0.6 mg. thiamine, 75 mg. choline chloride, 75 mg. inositol and 75 mg. para amino-benzoic acid.

The results of this experiment were as follows:

*Feed efficiency (average weight gain)*

| Diet | Initial weight (gm.) | Weight at end of 3 weeks (gm.) | Weight at end of 8 weeks (gm.) | Gain (gm.) | Liquid diet fed (gm.) | Solids consumed (gm.) | Gm. food required for 1 gm. gain (gm.) |
|---|---|---|---|---|---|---|---|
| 71.1% whey powder | 68.0 | 84.3 | | 16.3 | | 131.1 | 9.33 |
| 71.1% lactase-hydrolyzed whey powder | 64.2 | 110.1 | | 45.9 | | 163.6 | 3.93 |
| 71.1% whey | 67.1 | | 174.6 | 107.5 | | 526.8 | 5.09 |
| 71.1% lactase-treated whey powder diet for 3 weeks, 111.4% lactase-treated whey conc. diet for 5 weeks | 64.2 | | 193.1 | 129.6 | | 650.1 | 5.07 |
| Skim milk (32.59% solids) | 67.5 | 125.7 | | 58.6 | [1] 1,299.1 | [2] 413.2 | 7.33 |
| Lactase-hydrolyzed skim milk (29.06% solids) | 68.8 | 201.0 | | 132.2 | [1] 2,175.1 | [2] 630.3 | 4.82 |

[1] Entire wgt. of food fed. Food refusals not subtracted.
[2] Wgt. of food eaten. Food refusals subtracted.

The rats on the lactase-hydrolyzed whey powder diet gained more and made more efficient use of their food than those on the unhydrolyzed whey powder diet during the first three weeks of the experiment. At the end of eight weeks, the animals fed the lactase-hydrolyzed whey powder diet had gained more weight but food utilization was approximately the same on both diets; the lactase-hydrolyzed whey powder diet exceeded the unhydrolyzed whey powder diet both in food consumption and weight gain efficiency during the first three weeks of the experiment.

The animals on the condensed skim milk and lactase-hydrolyzed skim milk diets reacted in much the same way as those fed the whey diets. Less food was required for one gram of gain in the case of lactase-hydrolyzed skim milk diet, and at the end of the first three weeks of the test period, the animals fed the lactase-hydrolyzed skim milk diet weighed more, and had consumed more food. Two of the rats fed condensed skim milk died early in the experiment, whereas all of the animals survived on the lactase-hydrolyzed skim milk. The animals fed the lactase-hydrolyzed skim milk showed a much better appetite than the animals of the other group.

EXAMPLE 2

Day old sexed cockerel chicks at random selection were segregated into groups of 27. Ten different groups were started and raised in batteries. The milk supplements referred to below were incorporated directly in a ration of the following composition which was fed to all 10 groups.

| | Percent |
|---|---|
| Ground yellow corn | 53.000 |
| Soybean oil meal | 34.500 |
| Corn gluten meal (41%) | 6.000 |
| Fish meal (60%) | 1.000 |
| Meat and bone scraps (50%) | 1.000 |
| Riboflavin | 0.003 |
| Calcium pantothenate | 0.0015 |
| Niacin | 0.003 |
| Choline chloride (25%) | 0.60 |
| Mercks vitamin $B_{12}$ | 0.04 |
| 4,000A/800D fish oil | 0.128 |
| Steamed bone meal | 1.50 |
| Ground limestone | 1.50 |
| Iodized salt | 0.45 |
| Manganese sulfate | 0.05 |
| Total | 100.00 |
| Calculated protein | 23.22 |

All rations were fed ad libitum and fresh water continuously supplied. Water consumption for each group was recorded at two week intervals between weighings. The experiments were terminated at the end of nine weeks.

The following tabulation lists the rations fed to each of the 10 groups:
A—Basal: A practical broiler ration, adequate in all respects. This ration contains 1% fish meal and 1% meat scraps plus $B_{12}$ (Merck-free from antibiotics).
B—Basal plus 3% dried whey.
C—Basal plus 6% dried whey.
D—Basal plus 9% dried whey.
E—Basal plus 3% spray-dried lactase-hydroyzed whey.
F—Basal plus 6% spray-dried lactase-hydrolyzed whey.
G—Basal plus 9% spray-dried lactase-hydrolyzed whey.
H—Basal plus 3% lactase-hydrolyzed whey solids from condensed lactase-hydrolyzed whey.
I—Basal plus 6% lactase-hydrolyzed whey solids from condensed lactase-hydrolyzed whey.
J—aBsal plus 3% dried delactosed whey.[1]

[1] U. S. Patent 2,128,845 to Myers and Weisberg, dated August 30, 1938.

In the table below the gains made by each group of chicks for each two week weighing period are recorded, as well as the cumulative gains for the entire nine week test. The birds fed the lactase-hydrolyzed whey diet gained more during the nine week period than any of the other experimental groups.

*Nine week record of gains per chick on rations containing milk products*

[All weights in grams]

| Ration and experimental group | 0-2 wk. gain per chick | 2-4 wk. gain per chick | 4-6 wk. gain per chick | 6-8 wk. gain per chick | 8-9 wk. gain per chick | 0-9 wk. gain per chick |
|---|---|---|---|---|---|---|
| A—Basal | 102.01 | 250.51 | 306.33 | 363.15 | 213.46 | 1,235.46 |
| B—Basal plus 3% dried whey | 114.58 | 239.65 | 349.12 | 355.65 | 195.80 | 1,254.80 |
| C—Basal plus 6% dried whey | 117.04 | 239.00 | 322.63 | 355.33 | 208.67 | 1,242.67 |
| D—Basal plus 9% dried whey | 118.44 | 247.67 | 349.00 | 380.89 | 200.62 | 1,296.62 |
| E—Basal plus 3% spray-dried lactase-hydrolyzed whey | 119.24 | 263.84 | 330.52 | 405.40 | 217.84 | 1,336.84 |
| F—Basal plus 6% spray-dried lactase-hydrolyzed whey | 129.43 | 266.22 | 357.70 | 413.65 | 214.41 | 1,381.41 |
| G—Basal plus 9% spray-dried lactase-hydrolyzed whey | 138.80 | 266.57 | 344.09 | 394.54 | 194.45 | 1,338.45 |
| H—Basal plus 3% lactase-hydrolyzed whey solids from condensed lactase-hydrolyzed whey | 120.20 | 272.76 | 346.00 | 386.04 | 199.52 | 1,324.52 |
| I—Basal plus 6% lactase-hydrolyzed whey solids from condensed lactase-hydrolyzed whey | 123.13 | 257.50 | 349.37 | 387.00 | 194.91 | 1,311.91 |
| J—Basal plus 3% dried delactosed whey | 117.60 | 262.24 | 330.16 | 380.00 | 183.96 | 1,273.96 |

The feed intake of the 10 groups of birds is shown in the following table. This data shows group G to have consumed more feed over the nine week period than any of the other groups. The other groups also fed lactase hydrolyzed whey (groups F, G, H and I) consumed large amounts of feed in comparison with the control group A and control groups B and C which were fed dried unhydrolyzed whey, supplementing the basal rations. This is an evidence of the increased attractiveness of feeds containing lactase hydrolyzed materials to poultry. Thus the control and the whey containing materials are much less stimulating to the appetitie and consequently a lower feed intake results. It is obviously advantageous for a formula to stimulate the appetite because the rate

*Nine week record of feed intake (dry basis) for chicks fed rations containing various milk products*

[All weights in grams]

| Ration and experimental group | 0-2 wk. feed consumption per chick | 2-4 wk. feed consumption per chick | 4-6 wk. feed consumption per chick | 6-8 wk. feed consumption per chick | 8-9 wk. feed consumption per chick | Total feed consumed per chick |
|---|---|---|---|---|---|---|
| A—Basal | 182.96 | 497.77 | 745.91 | 997.30 | 536.92 | 2,960.86 |
| B—Basal plus 3% dried whey | 199.03 | 479.61 | 812.31 | 927.69 | 516.53 | 2,935.17 |
| C—Basal plus 6% dried whey | 162.78 | 561.85 | 834.07 | 962.22 | 698.89 | 3,219.81 |
| D—Basal plus 9% dried whey | 223.25 | 504.44 | 913.33 | 1,031.15 | 591.53 | 3,263.70 |
| E—Basal plus 3% dried hydrolyzed whey | 204.60 | 544.00 | 793.60 | 1,042.80 | 569.60 | 3,154.60 |
| F—Basal plus 6% dried hydrolyzed whey | 214.60 | 545.65 | 829.13 | 1,091.36 | 617.27 | 3,298.01 |
| G—Basal plus 9% dried hydrolyzed whey | 269.23 | 504.23 | 900.38 | 1,138.63 | 616.33 | 3,428.80 |
| H—Basal plus 3% condensed hydrolyzed whey | 217.44 | 539.60 | 853.20 | 1,192.80 | 596.80 | 3,399.84 |
| I—Basal plus 6% condensed hydrolyzed whey | 230.79 | 570.41 | 856.66 | 1,113.47 | 565.65 | 3,336.98 |
| J—Basal plus 3% dried delactosed whey | 216.00 | 527.20 | 791.60 | 1,033.20 | 543.20 | 3,111.20 | of growth is always influenced by the amount of feed intake.

The following table shows the feed efficiency (grams of feed per gram of grain) of each two-week weighing period, as well as the cumulative feed efficiency. In the case of groups F, H and I the feed efficiency was greater. The feed efficiency of group E is lower than the control. Feed efficiency is defined as the grams of feed consumed necessary to produce one gram of gain in body weight. Thus the lower the feed efficiency value the more economical the feedstuff because feed utilization is better. The table indicates that group E is superior in feed efficiency to any other group while group F was substantially equivalent to the control. However in general the feed efficiency is not quite as good as the control. This result must be considered in conjunction with the table on weight gains. Labor and time are factors in the cost of producing poultry and thus faster weight gains lead to less labor in feeding and more poultry crops per year. In the table on weight gains it is apparent that the lactase-hydrolyzed supplemented diets are superior to all the others and lead to 6 to 12% greater rate of weight increase than the control.

*Composition of stock diet*

| Ingredients: | Amount (g.) |
|---|---|
| Yellow maize | 28.0 |
| Whole wheat flour | 28.0 |
| Casein | 7.0 |
| Dried whole milk | 21.0 |
| Alfalfa meal | 2.0 |
| Linseed oil meal | 7.0 |
| Dried pork liver | 3.0 |
| Cod liver oil | 1.0 |

*Nine week record of efficiency [1] for chicks fed rations containing various milk products (dry basis)*

| Ration and experimental group | 0-2 wk. feed efficiency | 2-4 wk. feed efficiency | 4-6 wk. feed efficiency | 6-8 wk. feed efficiency | 8-9 wk. feed efficiency | 0-9 wk. feed efficiency |
|---|---|---|---|---|---|---|
| A—Basal | 1.79 | 1.94 | 2.10 | 2.40 | 2.10 | 2.40 |
| B—Basal plus 3% dried whey | 1.74 | 2.00 | 2.30 | 2.95 | 2.74 | 2.43 |
| C—Basal plus 6% dried whey | 1.38 | 2.35 | 2.47 | 2.71 | 3.35 | 2.56 |
| D—Basal plus 9% dried whey | 1.89 | 2.04 | 2.62 | 2.92 | 2.95 | 2.56 |
| E—Basal plus 3% spray-dried lactase-hydrolyzed whey | 1.72 | 2.06 | 2.40 | 2.57 | 2.61 | 2.36 |
| F—Basal plus 6% spray-dried lactase-hydrolyzed whey | 1.66 | 2.05 | 2.32 | 2.88 | 2.87 | 2.44 |
| G—Basal plus 9% spray-dried lactase-hydrolyzed whey | 1.94 | 1.89 | 2.60 | 3.70 | 4.33 | 2.79 |
| H—Basal plus 3% hydrolyzed whey solids from condensed hydrolyzed whey | 1.81 | 1.98 | 2.50 | 3.09 | 2.98 | 2.57 |
| I—Basal plus 6% hydrolyzed whey solids from condensed hydrolyzed whey | 1.87 | 2.21 | 2.45 | 3.13 | 2.90 | 2.60 |
| J—Basal plus 3% dried delactosed whey | 1.84 | 2.00 | 2.40 | 2.71 | 3.03 | 2.44 |

[1] Feed efficiency—grams of feed consumed to produce one gram of gain.

The data in the following table shows the percentage gain over or above the basal ration. The groups which had statistically different gains over group A also had large early gains. This tends to indicate that large early gains are essential for the production of 3 lb. broilers in nine or ten weeks.

| | |
|---|---|
| Phillips and Hart salt mixture | 2.0 |
| Phillips and Hart mineral mixture, 0.5 cc. | |
| Sodium chloride | 0.5 |
| Calcium carbonate | 0.5 |
| Total | 100.0 |

*Weight gains*

| Ration and experimental group | 2nd wk. | Percent | 4th wk. | Percent | 6th wk. | Percent | 8th wk. | Percent | 9th wk. | Percent | Accumulative weight gains | Percent |
|---|---|---|---|---|---|---|---|---|---|---|---|---|
| A—Basal | 102.01 | 100 | 250.51 | 100 | 306.33 | 100 | 363.15 | 100 | 213.46 | 100 | 1,235.46 | 100 |
| B—Basal plus 3% dried whey | 114.58 | 112 | 239.65 | 96 | 349.12 | 114 | 355.65 | 97 | 195.80 | 92 | 1,254.80 | 102 |
| C—Basal plus 6% dried whey | 117.04 | 115 | 239.00 | 95 | 322.63 | 105 | 355.33 | 97 | 208.67 | 98 | 1,242.67 | 101 |
| D—Basal plus 9% dried whey | 118.44 | 116 | 247.67 | 99 | 349.00 | 114 | 380.89 | 105 | 200.62 | 94 | 1,296.62 | 105 |
| E—Basal plus 3% dried hydrolyzed whey | 119.24 | 117 | 263.84 | 105 | 330.52 | 108 | 405.40 | 116 | 217.84 | 102 | 1,336.84 | 108 |
| F—Basal plus 6% dried hydrolyzed whey | 129.43 | 127 | 266.22 | 106 | 357.70 | 117 | 413.65 | 114 | 214.41 | 100 | 1,381.41 | 112 |
| G—Basal plus 9% dried hydrolyzed whey | 138.80 | 136 | 266.57 | 106 | 344.09 | 112 | 394.54 | 109 | 194.45 | 91 | 1,338.45 | 108 |
| H—Basal plus 3% condensed hydrolyzed whey | 120.20 | 118 | 272.76 | 109 | 346.00 | 113 | 386.04 | 106 | 199.52 | 93 | 1,324.52 | 107 |
| I—Basal plus 6% condensed hydrolyzed whey | 123.13 | 121 | 257.50 | 103 | 349.37 | 114 | 387.00 | 107 | 194.91 | 91 | 1,311.91 | 106 |
| J—Basal plus 3% dried delactosed whey | 117.60 | 115 | 262.24 | 105 | 330.16 | 108 | 380.00 | 105 | 183.96 | 86 | 1,273.96 | 103 |

The general health of all of the birds was excellent.

These test results indicate the optimum of feed lactase-hydrolyzed whey to be about 6%. At this level larger gains are made on less feed than at the 9% level. The optimum level of feeding condensed lactase-hydrolyzed whey appears to be about 3%.

It would be concluded from these results that rations E, F, G, H and I are superior to ration A.

Rations B, C, D and J are not superior to ration A, thus showing that the improvement in rations E, F, G, H and I is due to the lactase-hydrolyzed whey solids therein.

EXAMPLE 3

In this test, 3 groups of 24 rats each and 1 group of 12 rats were fed the diets indicated ad libitum for 5 gestation and gestation-lactation periods (fifty-two weeks).

*Composition of lactose diets*

| Ingredients | Basal diet (g.) | 15% Lactose diet (g.) | 15% hydrolyzed lactose diet (g.) |
|---|---|---|---|
| Casein | 24.0 | 24.0 | 24.0 |
| Phillips and Hart salt mixture | 4.0 | 4.0 | 4.0 |
| Phillips and Hart mineral mixture, 1 cc.[1] | | | |
| Butterfat | 6.0 | 6.0 | 6.0 |
| Cod Liver oil + E and K | 2.0 | 2.0 | 2.0 |
| Vitamins and starch | 2.0 | 2.0 | 2.0 |
| Liver concentrate (1-20) | 2.0 | 2.0 | 2.0 |
| Cornstarch | 60.0 | 45.0 | 45.0 |
| Enzyme-hydrolyzed lactose [2] | | | 19.2 |
| Lactose | | 15.0 | |
| Total | 100.0 | 100.0 | 100.0 |

[1] Trace minerals added in solution.
[2] Syrup—78% solids. 19.2g.=15g. hydrolyzed lactose solids.

The results of the test were as follows:

*Average performance on 4 diets—gestation—lactation periods*

| Diet | Number of rats | Average number litters per rat | Average number young born per litter | Average birth weight (gm.) | Number young disappearing 1-3 days (per litter) | Number young disappearing 4-21 days (per litter) | Number young killed 3rd day (per litter) | Number young weaned per litter born | Average weaning weight (gm.) | Average weight change of mother (gm.) |
|---|---|---|---|---|---|---|---|---|---|---|
| Basal | 24 | 4.7 | 9.6 | 6.0 | 2.8 | 1.1 | 2.4 | 3.4 | 42.4 | −13.2 |
| 15% lactose | 24 | 4.8 | 10.4 | 6.0 | 2.0 | 1.0 | 3.3 | 4.2 | 44.0 | −11.1 |
| 15% enzyme hydrolyzed lactose | 24 | 5.0 | 10.4 | 6.0 | 2.0 | 0.5 | 3.1 | 4.6 | 48.5 | −20.3 |
| Stock | 12 | 4.7 | 10.7 | 6.2 | 1.3 | 1.8 | 4.0 | 3.6 | 45.2 | −7.6 |

The data shows that the rats fed the lactase-hydrolyzed lactose gained most weight in the course of the feeding period, and more young were weaned per litter.

EXAMPLE 4

The following is an example of a pig emulsion to be used as a supplement from the time they are able to eat supplementary food until approximately the fourteenth week. As the pigs continue to grow beyond the fourteenth week, this supplement can be reduced to 0.5% to 2% of the total diet.

Constituent: Optimum formula (parts)
Total whole whey solids _____ 1,750
    Unhydrolyzed whey solids _____ 875
    Lactase-hydrolyzed whey solids ___ 875
Buttermilk powder _____ 250
Soya meal _____ 575
Lard _____ 100
Water _____ 2,325

EXAMPLE 5

The following is a specific formulation designed for suckling pigs:

Constituent: Optimum formula (parts)
Total whole whey solids _____ 1,358
    Unhydrolyzed whey solids _____ 375
    Lactase-hydrolyzed whey solids ___ 983
Buttermilk powder _____ 823
Soya meal _____ 192.5
Soya oil _____ 247.5
Water _____ 2,621

The infant pigs are fed with this formulation starting from the second week of birth. From the fourth to the twelfth week the formulation is a major part of their diet. From the twelfth week, the proportion is reduced to about 15% of the total diet and after about seventy days the formulation can be discontinued and a straight whey solids formulation fed.

EXAMPLE 6

A typical poultry supplement has the following formulation:

Constituent: Optimum formula (parts)
Total whole whey solids _____ 1,358
    Unhydrolyzed whey solids _____ 375
    Lactase-hydrolyzed whey solids ___ 983
Skim milk powder _____ 823
Oat groat flour _____ 192.5
Cottonseed oil _____ 247.5
Water _____ 2,621

This formulation is designed as a finishing formula with the aim of producing a quick fattening of the poultry. The formulation will be fed for four weeks, at the finish of the feeding period. This supplement may also have a sparing action on the amount of feed necessary to obtain the desired condition in the poultry prior to marketing.

EXAMPLE 7

The following is a specific formulation designed for a starter calf food:

Constituent: Percent
Skim milk powder _____ 70
Lactase hydrolyzed skim milk powder ___ 20
Oat groat flour _____ 10

Total _____ 100

In Examples 4–6 specific formulation of pigs, poultry supplements are given. The proportions of the components of these formulations actually could be widely varied and the following general ranges suggest other compositions which could be prepared:

Pig emulsion

Constituent: Permissible range, percent
Total whole whey solids _____ 10 to 55
    Unhydrolyzed whey solids _____ [1] 20 to 80
    Lactase-hydrolyzed whey solids ___ [1] 80 to 20
Other milk products _____ 5 to 20
Cereal products _____ 5 to 50
Fat _____ 2 to 15
Water _____ 40 to 70

Suckling pigs emulsion

Constituent: Permissible range, percent
Total whole whey solids _____ [2] 10 to 55
    Unhydrolyzed whey solids _____ [1] 0 to 70
    Lactase-hydrolyzed whey solids ___ [1] 100 to 30
Other milk products _____ [2] 10 to 30
Cereal products _____ [2] 1 to 10
Fats _____ [2] 1 to 10
Water _____ [2] 35 to 60

Poultry supplement

Constituent: Permissible range, percent
Total whole whey solids _____ [2] 10 to 40
    Unhydrolyzed whey solids _____ [1] 10 to 90
    Lactase-hydrolyzed whey solids ___ [1] 90 to 10
Other milk products _____ [2] 40 to 10
Cereal products _____ [2] 1 to 12
Fat _____ [2] 0.2 to 5
Water _____ [2] 50 to 75

Feed supplement for calves

Constituent: Permissible range, percent
Total whole whey solids _____ 0 to 30
    Unhydrolyzed whey solids _____ [1] 20 to 80
    Lactase-hydrolyzed whey solids ___ [1] 80 to 20
Other milk products _____ 50 to 40
Cereal products _____ 15 to 30

[1] Of total whey solids.
[2] Of formula.

The above formulations are in emulsion form. It will be understood that dry formulations can be made of equivalent quality simply by omitting the water. Usually, however, it is preferable to prepare the feed or feed supplement as a fluid emulsion or solution having a solids content within the range from 25 to 60%.

In the examples, the lactase-hydrolyzed milk products used were obtained by the process outlined in the prior copending application Serial No. 198,506. It will be understood that other lactase-hydrolyzed milk products can be used. Lactose which has been hydrolyzed by action of inorganic acids also can be used. The lactase-hydrolyzed milk solids are, however, preferred because their use appears to give exceptional beneficial effects. It is thought that these benefits may be due to the sugars other than glucose and galactose present in the hydrolysis reaction mixture but not as yet identified.

The compositions of the invention can be used as feed supplements, in which event from 1 to 40% of the diet for example can be the supplement and the remainder a standard complete diet. The invention also is applicable to complete diets in which the lactase-hydrolyzed lactose is added directly to the standard dietary formula.

All percentages in the specification and claims are by weight.

I claim:

1. A feed for animals and poultry comprising lactase-hydrolyzed lactose, a milk product, a cereal and a fat.

2. A feed for animals and poultry comprising lactase-hydrolyzed whey solids, a cereal and a fat.

3. A feed for animals and poultry comprising lactase-hydrolyzed skim milk solids, a cereal and a fat.

4. An emulsion feed for pigs comprising from 10 to 55% total whey solids, of which from 20 to 80% are unhydrolyzed whey solids, and from 80 to 20% are lactase-hydrolyzed whey solids, from 5 to 20% milk product other than whey, from 5 to 50% cereal, from 2 to 15% fat and from 40 to 70% water.

5. An emulsion feed for suckling pigs comprising from 10 to 55% total whey solids, of which up to 70% are unhydrolyzed whey solids, and from 30 to 100% are lactase-hydrolyzed whey solids, from 10 to 30% milk product other than whey, from 1 to 10% cereal, from 1 to 10% fat and from 35 to 60% water.

6. A poultry supplement comprising from 10 to 40% total whey solids of which from 10 to 90% are unhydrolyzed whey solids and from 90 to 10% are lactase-hydrolyzed whey solids, from 10 to 40% milk product other than whey, from 1 to 12% cereal, from 0.2 to 5% fat and from 50 to 75% water.

7. A calf supplement comprising up to 30% total whey solids, of which from 20 to 80% are unhydrolyzed whey solids and from 80 to 20% are lactase-hydrolyzed whey solids, from 40 to 50% milk product other than whey and from 75 to 50% cereal.

8. A feed comprising a lactase-hydrolyzed lactose of which at least 50% of the lactose has been hydrolyzed, a milk product, a cereal and fat.

9. A feed comprising lactase-hydrolyzed whey solids, of which at least 50% of the lactose content thereof has been hydrolyzed, a cereal and a fat.

10. A feed comprising lactase-hydrolyzed milk solids, of which at least 50% of the lactose content thereof has been hydrolyzed, a cereal and a fat.

11. An emulsion feed for pigs comprising from 10 to 55% lactase-hydrolyzed whey solids, of which at least 50% of the lactose content thereof has been hydrolyzed, from 5 to 20% milk product other than whey, from 5 to 50% cereal, from 2 to 15% fat and from 40 to 70% water.

12. An emulsion feed for suckling pigs comprising from 10 to 55% lactase-hydrolyzed whey solids, of which at least 50% of the lactose content thereof has been hydrolyzed, from 10 to 30% milk product other than whey, from 1 to 10% cereal, from 1 to 10% fat and from 35 to 60% water.

13. A poultry supplement comprising from 10 to 40% lactase-hydrolyzed whey solids, of which at least 50% of the lactose content thereof has been hydrolyzed, from 10 to 40% milk product other than whey, from 1 to 12% cereal, from 0.2 to 5% fat and from 50 to 75% water.

14. A calf supplement comprising up to 30% lactase-hydrolyzed whey solids, of which at least 50% of the lactose content thereof has been hydrolyzed, from 40 to 50% milk product other than whey and from 75 to 50% cereal.

References Cited in the file of this patent

UNITED STATES PATENTS

| | | |
|---|---|---|
| 46,585 | Percy | Feb. 28, 1865 |
| 2,482,724 | Baker | Sept. 20, 1949 |
| 2,536,438 | Grelck | Jan. 2, 1951 |
| 2,608,483 | Hayes | Aug. 26, 1952 |
| 2,681,858 | Stimpson | June 22, 1954 |

UNITED STATES PATENT OFFICE
CERTIFICATE OF CORRECTION

Patent No. 2,781,266                                       February 12, 1957

Edwin G. Stimpson

It is hereby certified that error appears in the printed specification of the above numbered patent requiring correction and that the said Letters Patent should read as corrected below.

Column 3, line 9, for "lactose" read -- lactase --; column 5, line 71, for "hydroyzed" read -- hydrolyzed --; column 6, line 3, for "aBsal" read -- Basal --; line 41, for "appetitie" read -- appetite --; column 7, following line 10, in the heading to the table, for "record of efficiency" read -- record of feed efficiency --.

Signed and sealed this 23rd day of April 1957.

(SEAL)
Attest:
KARL H. AXLINE
Attesting Officer

ROBERT C. WATSON
                                                                          Commissioner of Patents